United States Patent
Andrews et al.

(10) Patent No.: US 9,205,651 B2
(45) Date of Patent: Dec. 8, 2015

(54) SUBTRACTIVE THREE DIMENSIONAL FABRICATION OF AN INKJET PLATE

(71) Applicant: XEROX CORPORATION, Norwalk, CT (US)

(72) Inventors: John R. Andrews, Fairport, NY (US); Terrance L. Stephens, Canby, OR (US); Ruander Cardenas, Wilsonville, OR (US)

(73) Assignee: XEROX CORPORATION, Norwalk, CT (US)

( * ) Notice: Subject to any disclaimer, the term of this patent is extended or adjusted under 35 U.S.C. 154(b) by 136 days.

(21) Appl. No.: 14/160,358

(22) Filed: Jan. 21, 2014

(65) Prior Publication Data

US 2015/0202868 A1    Jul. 23, 2015

(51) Int. Cl.
*B41J 2/015* (2006.01)
*B41J 2/15* (2006.01)
*B41J 2/14* (2006.01)
*B23K 26/36* (2014.01)
*B41J 2/16* (2006.01)

(52) U.S. Cl.
CPC ............ *B41J 2/1433* (2013.01); *B23K 26/365* (2013.01); *B41J 2/1628* (2013.01); *B41J 2/1634* (2013.01)

(58) Field of Classification Search
None
See application file for complete search history.

(56) References Cited

U.S. PATENT DOCUMENTS

| | | | | |
|---|---|---|---|---|
| 6,273,557 | B1* | 8/2001 | Milligan et al. | 347/65 |
| 6,534,247 | B2* | 3/2003 | Milligan et al. | 430/320 |
| 7,357,499 | B2* | 4/2008 | Kim | 347/92 |
| 7,708,372 | B2* | 5/2010 | Silverbrook | 347/20 |
| 7,753,469 | B2* | 7/2010 | Silverbrook | 347/20 |
| 7,857,422 | B2* | 12/2010 | Delametter et al. | 347/40 |
| 2004/0263595 | A1* | 12/2004 | Keenan et al. | 347/93 |
| 2012/0274707 | A1* | 11/2012 | Cai et al. | 347/47 |
| 2013/0065017 | A1* | 3/2013 | Sieber | 428/137 |
| 2015/0151539 | A1 | 6/2015 | Stephens | |

* cited by examiner

*Primary Examiner* — Asok K Sarkar
(74) *Attorney, Agent, or Firm* — Marger Johnson

(57) ABSTRACT

A fluidic structure formed in a film, including a particle filter formed at a bottom surface of the film having a depth less than a thickness of the film, a cavity fluidically connected to the particle filter extending from a top of the particle filter to a top surface of the film, an inlet fluidically connected to and positioned adjacent to the cavity, the inlet having a depth less than or equal to a thickness of the film and extending to the top surface of the film, and a body port extending from the top surface of the film into some depth of the film , the body port fluidically connected to the inlet.

11 Claims, 10 Drawing Sheets

SUBTRACTIVE THREE DIMENSIONAL FABRICATION OF AN INKJET PLATE

BACKGROUND

The desire for higher quality printing continues to grow. Higher quality prints require more and more dots per inch. This in turn leads to higher and higher density in the printing elements that dispense ink onto a print substrate. Ink jet printers use nozzles or jets in the final plate in a stack of plates that route the ink to the nozzles. The stack of plates form body chambers into which ink flows from a reservoir and then out to a corresponding nozzle.

In order to achieve the higher dots per inch, the print heads require higher packing density. Packing density is the number of jets per inch of the nozzle plate. The manufacture of such tightly packed jets gives rise to many problems. One approach employs an architecture in which the inlet into the body chamber and outlet to the nozzle are concentric to each other, referred to here as a multifunctional architecture. U.S. patent application Ser. No. 14/095,127, filed Dec. 3, 2013. The realization of such a jet architecture and its practical application to manufacturing inkjet plates requires an effective and efficient fabrication technique for creating a multifunctional three-dimensional fluidic structure with tightly controlled geometric parameters.

DETAILED DESCRIPTION OF THE EMBODIMENTS

Figure 1:
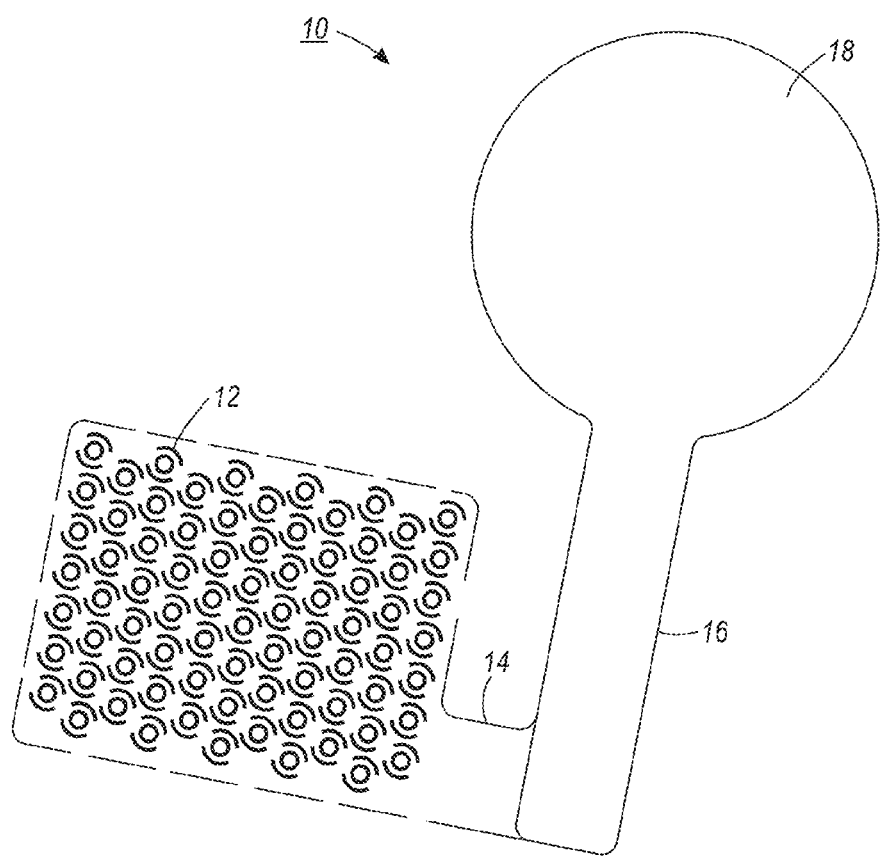
FIG. 1 shows an embodiment of a multifunctional fluidic element.

FIG. 1 shows an embodiment of a multifunctional fluidic element 10. The element is referred to as multifunctional because the body port 18 serves to both intake the ink through the rock screen into a body chamber and then out through the port to a print substrate. The completed element 10 has a rock screen or particle filter 12 that filters the ink as it enters into the inlet. There is channel 14 between cavity and the inlet 16, and the inlet couples the body port 18 to the cavity next to the particle filter 12, which will become clearer in further drawings.

This element will typically be formed in a film such as polymer, polyimide, polytetrafluoroethylene, metal and composite. Some of the materials used may be manufactured under the names Kapton®, Teflon® or Upilex®. The manufacturing process may comprise a 2- or 3-step subtractive process. A subtractive process involves selective removal of materials, such as removal of material from a piece of film.

Figure 2:
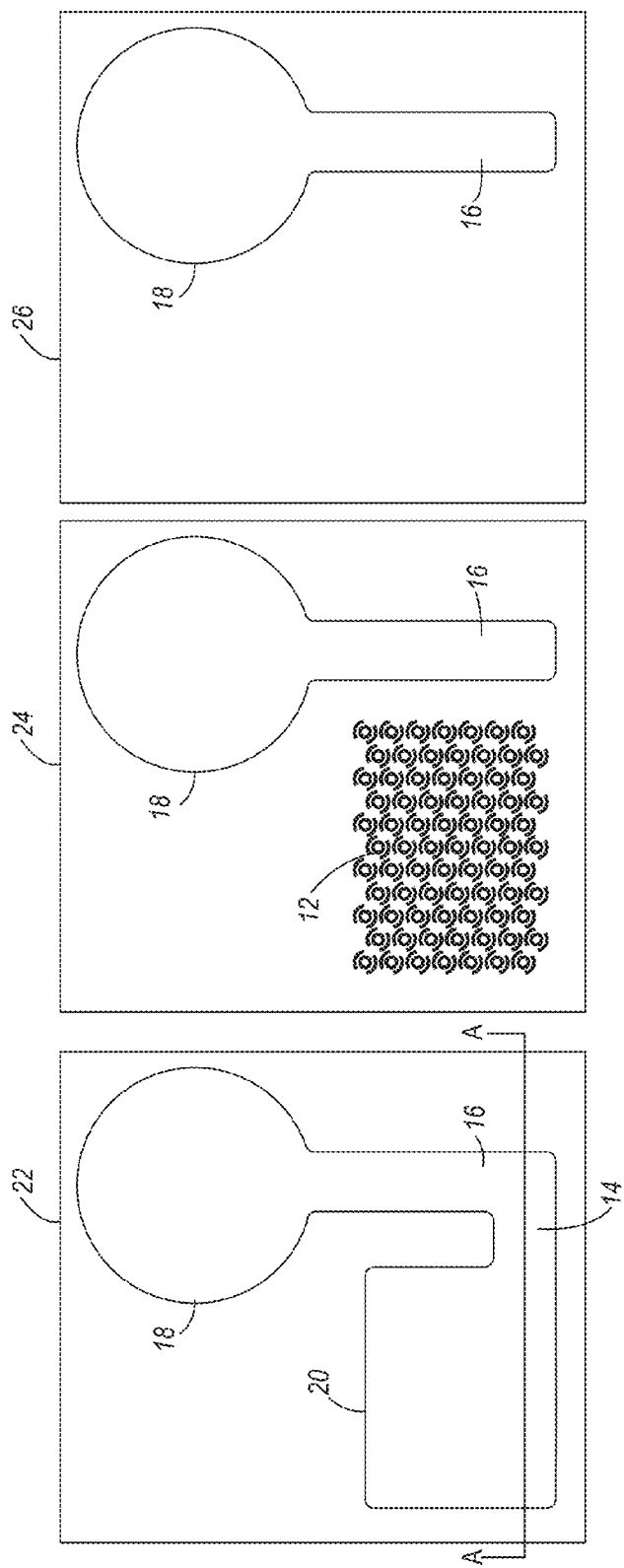
FIG. 2 shows a flowchart of an embodiment of a process of manufacturing a multifunctional fluidic element.

FIG. 2 shows the film as it undergoes processing. In panel 22, the process removes the first layer of material to a first depth. The layer includes a cavity or inlet plenum 20, the inlet channel 14, the inlet 16 and the outlet body port 18. Removal of the first layer material may occur with the use of an excimer laser. The laser ablates the material to take it out of the film. In panel 24, the second ablation process forms a pattern in the cavity 22 to form the particle filter or rock screen 12, and cuts again on the inlet 16 and the outlet body port 18.

The laser ablation process may remove material down to a depth selectable by the designer. The process may involve 2 or 3 steps. For a 2-step process, the inlet and the body port would be complete upon the second process of FIG. 2. In a 3-step process, the laser is used again in panel 26 to further refine the inlet 16 and the outlet body port 18. This may be a necessary or unnecessary step, depending upon the desired precision and formation of the inlet and port.

Figure 3:
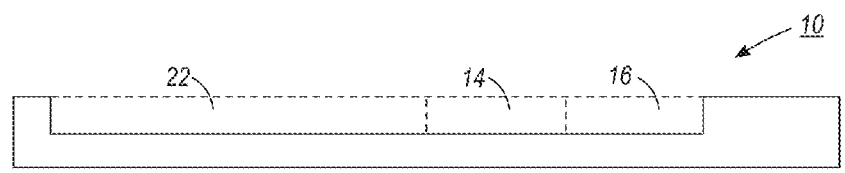
FIG. 3-4 shows side views of a multifunctional fluidic element during manufacture.
Figure 4:
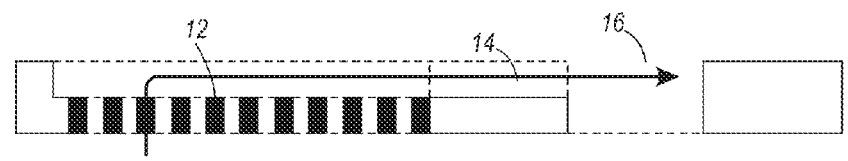

FIGS. 3 and 4 show side views of the film during the first and second ablation processes along the cross section A-A shown in panel 22. In FIG. 3, the fluidic element 10 is formed from a piece of film. The film has an initial thickness as shown to the sides of the film and by the dotted horizontal line. In the first ablation process, the laser removes material from the cavity 20, the channel 14 and the inlet 16. From this view, one cannot see the outlet body port. In FIG. 4, the laser removes selective portions of the film that underlie the cavity 20 from FIG. 3. The pattern may comprise an array of holes that allow the fluid to flow through it, while keeping particles out of the fluid path. The channel 14 remains at the same depth as the portions of the particle filter. The channel 16 and the body port are ablated through the thickness of the film. The fluid flow direction is shown by the arrow in FIG. 4.

In one embodiment, the film may have a thickness of 0.0762 mm In this embodiment, the first depth goes to 0.051 mm, where 0.025 mm of the material remains behind. The particle filter is then cut from the 0.025 mm depth to the back surface of the film, the channel has a depth of 0.051 mm, with 0.025 mm as the backing, with the inlet port cut all the way through the film. In one embodiment, the film is bonded to a rigid plate. The film is bonded to the plate and then the ablation process occurs. This may be referred to as a bond-and-cut process, U.S. patent application Ser. No. 13/791,994, filed Mar. 9, 2013.

Figure 5:
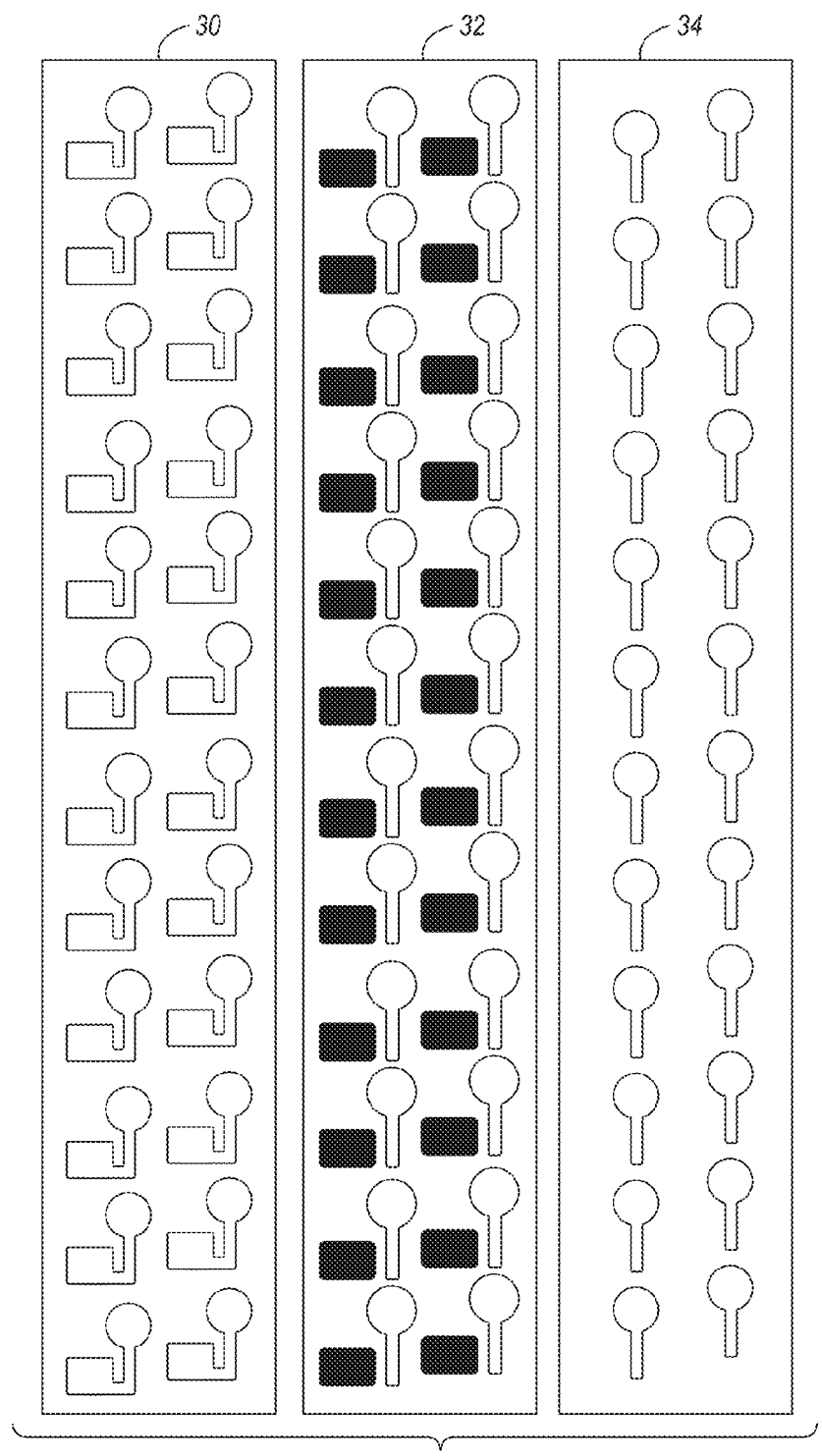
FIG. 5 shows an embodiment of a laser field of view used in manufacture of an array of multifunctional fluidic elements.

One embodiment of the process of manufacturing the fluidic elements involves use of a laser mask 30 as shown in FIG. 5. Several embodiments of the process are possible. In one embodiment, the process positions the laser mask 30, then the first layer of the film is ablated. A motion control or similar system would then reposition the film to allow the laser to ablate a second region of the film with the first mask 30. This process is repeated until the desired number of elements have been imaged to the first depth across the film. The motion control system then returns the film to the position it originally had at the start. The mask 30 is then exchanged for the mask 32 and the process is repeated until the elements have all been imaged to the second depth. If desired, a third mask 34 may be used to clean up the inlet and body ports as needed.

In a second embodiment, the film is positioned adjacent to the laser system. The first mask 30 is positioned and the first region of the film is ablated to the first depth. The first mask 30 is then exchanged for the second mask 32 and the same region is ablated to the second depth. The film is then moved relative the imaging field of the laser and the first mask 30 is used again to ablate a second region to the first depth, and then the mask is exchanged again. This process is then repeated until the desired number of elements have been imaged to the second depth. If a third mask such as 34 is used, it would be used after the second mask 32 before the film is moved relative to the laser imaging field.

A third embodiment combines a combination of the other two embodiments. The embodiment selected depends upon the system and the parameters such as processing speed, positional and geometrical accuracy, and system capabilities.

One should note that the x and y dimensions are primarily controlled by the image pattern on the imaging mask. The etch depth is mainly controlled by the laser fluence, typically expressed in Joules per centimeter squares (J/cm$^2$), and the number of laser pulses.

Figure 6:
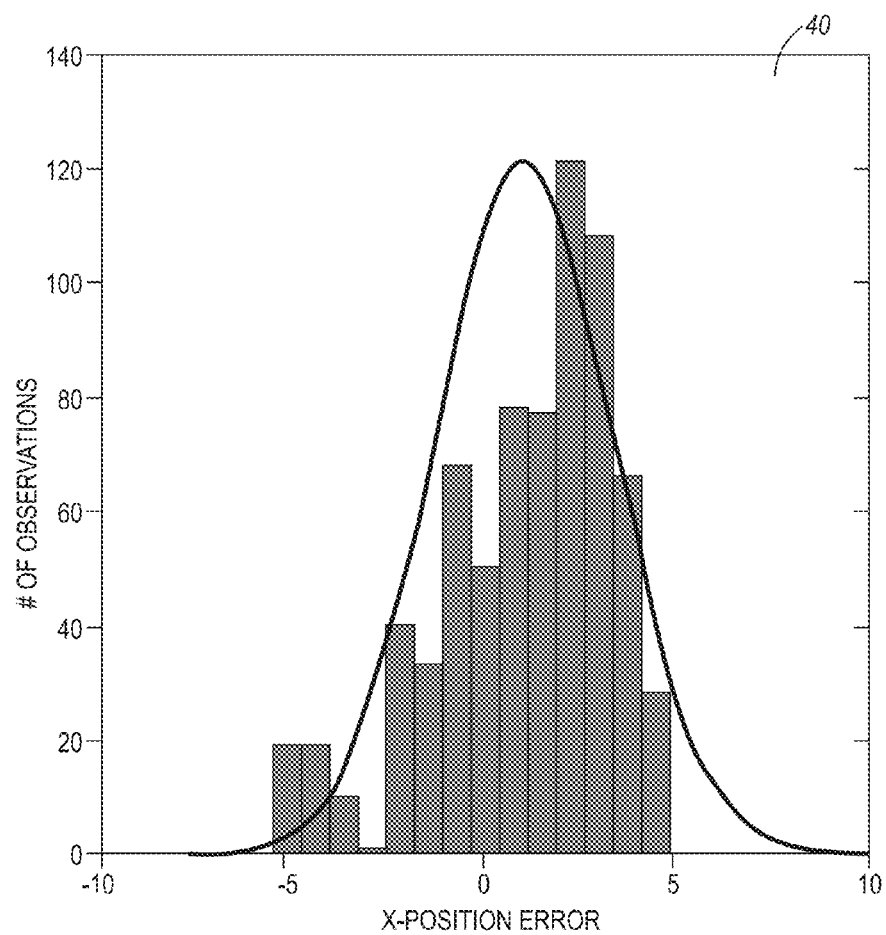
FIGS. 6-11 show histograms of several parameters of interest.
Figure 7:
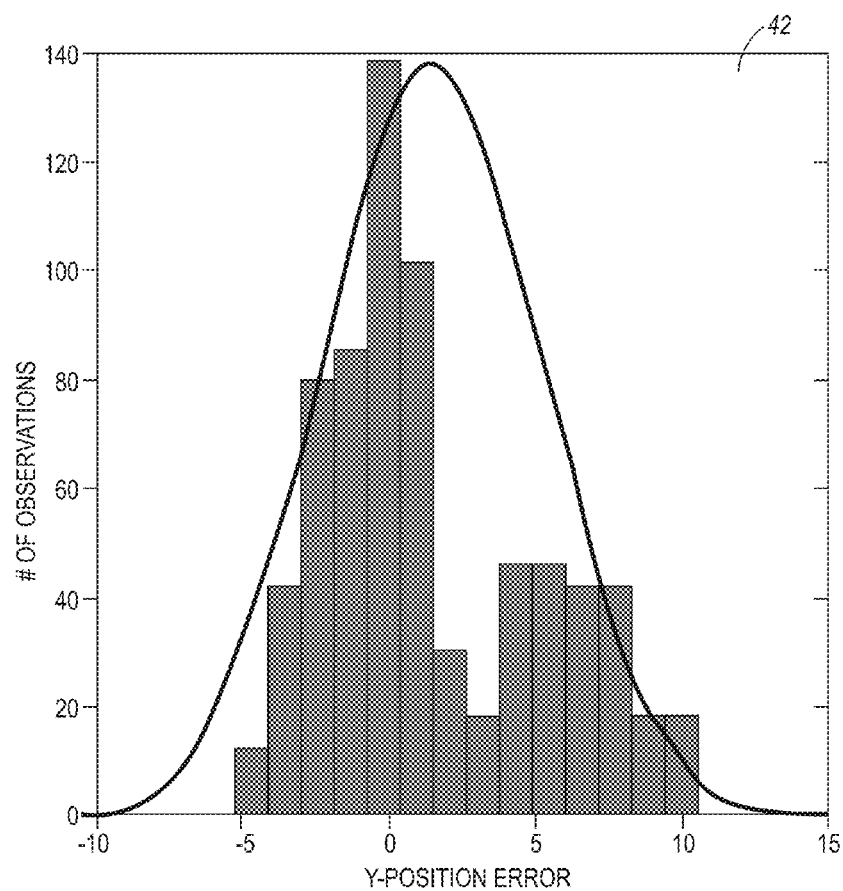
Figure 8:
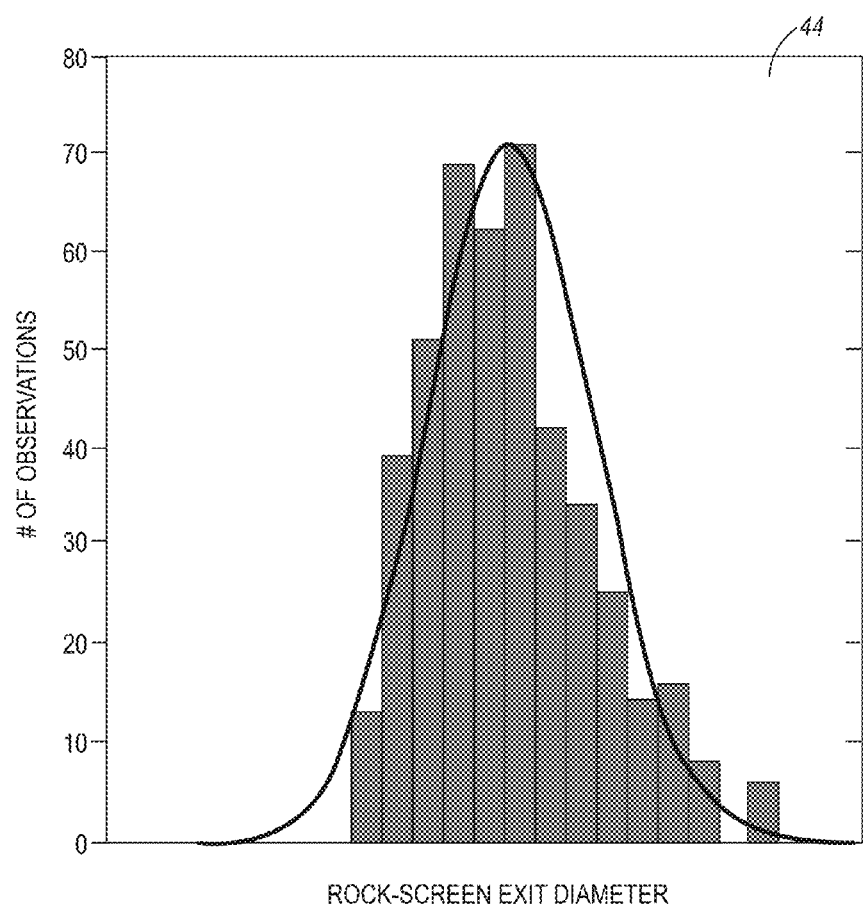
Figure 9:
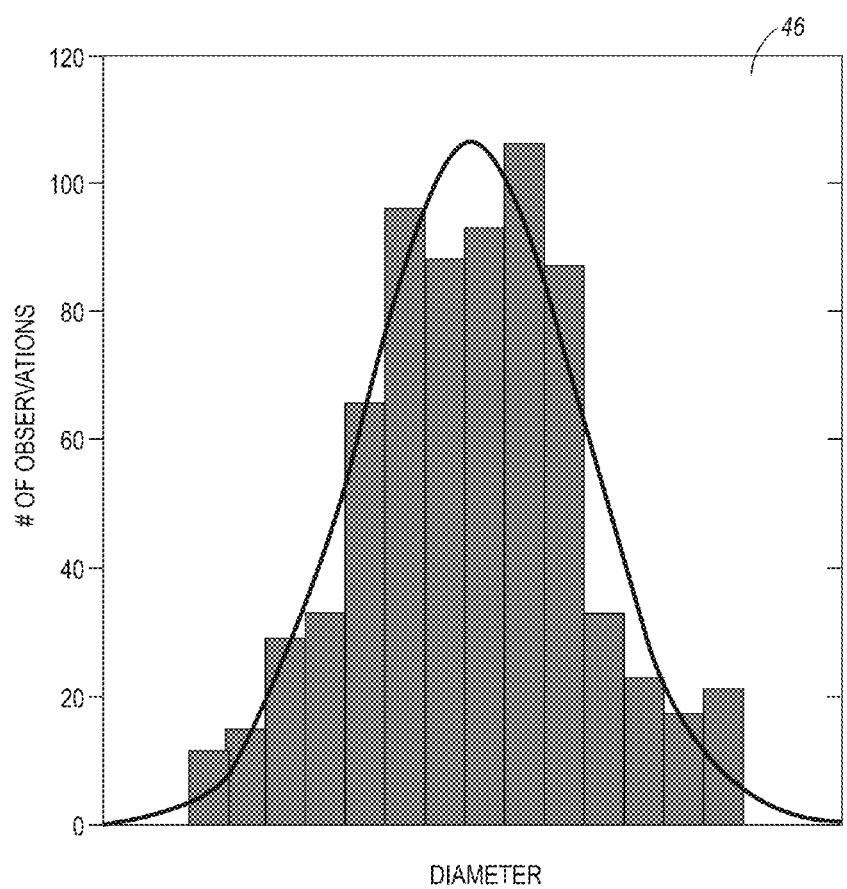
Figure 10:
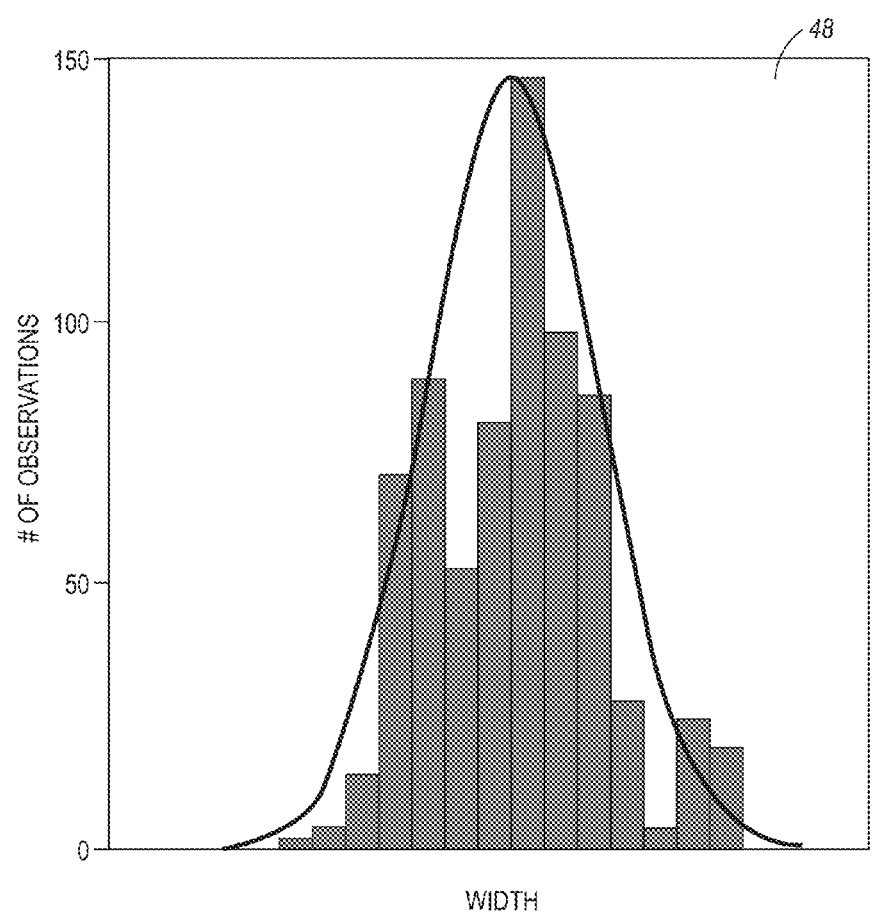
Figure 11:
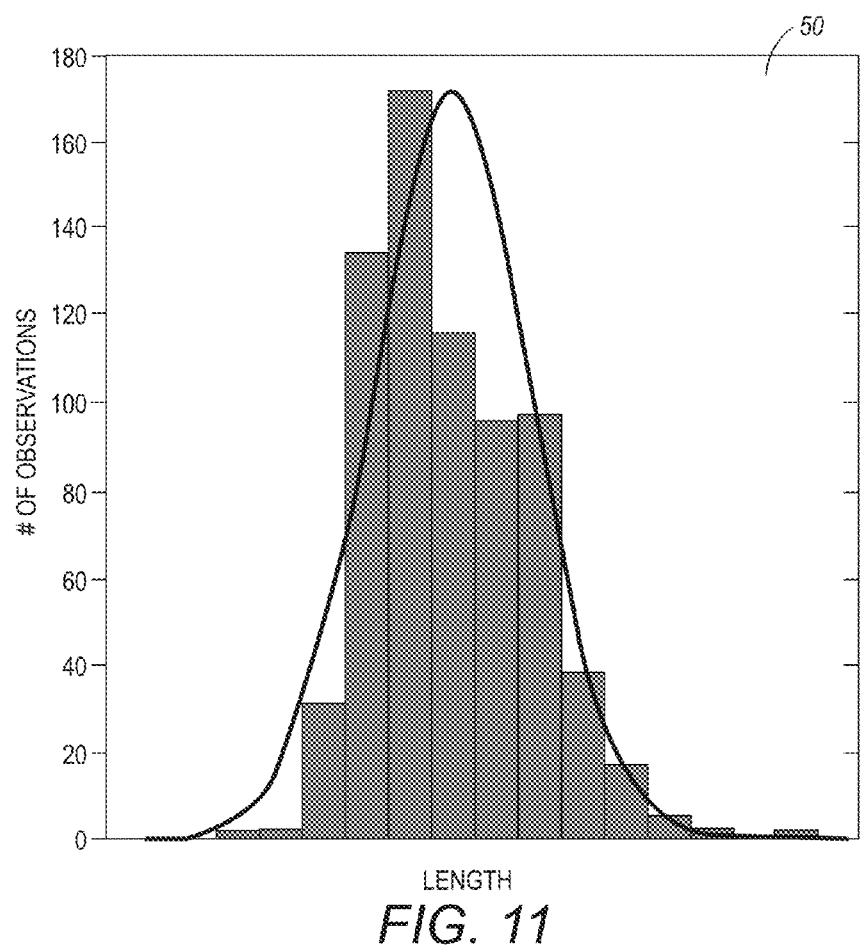

FIGS. 6-11 shows a set of histograms about the distribution of several parameters measured during manufacture. In FIG. 6, the x-axis position error 40 and FIG. 7 shows the y-axis position error 42. In one embodiment the deviations are only in the micrometer range. FIG. 8 shows the rock screen exit diameter 44, FIG. 9 shows the body outlet diameter 46, FIG. 10 shows the inlet channel width 48, and FIG. 11 shows the inlet channel length 50. Position errors relate to the location of the feature relative to a reference feature located on the metal plate. Geometric features relate to the shape and dimension of the features, such as the particle filter diameter, the entrance/outlet diameter, the inlet width and the inlet length. The standard deviation for the geometrical features is typically only a micrometer or less using this process, which is a level or precision not previously attainable.

In this manner, a laser manufacturing process produces an array of fluidic elements within tight manufacturing tolerances in a repetitive, subtractive ablation process. This allows for higher packing density for the fluidic elements. The process allows for multiple fluidic elements to be manufactured at one time and in one part. In one embodiment, the process can manufacture 24 elements in one image field, in another one can process 48 elements in one image field. The process may be implemented in a bond-and-cut process such as that disclosed in the US Patent Application mentioned above, where the film is bonded to a rigid, functional plate, such as a stainless steel manifold plate prior to the ablation process.

It will be appreciated that several of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A fluidic structure formed in a film, comprising:
   a particle filter formed at a bottom surface of the film having a depth less than a thickness of the film;
   a cavity fluidically connected to the particle filter extending from a top of the particle filter to a top surface of the film;
   an inlet fluidically connected to and positioned adjacent to the cavity, the inlet having a depth less than or equal to a thickness of the film and extending to the top surface of the film; and
   a body port extending from the top surface of the film into some depth of the film, the body port fluidically connected to the inlet.

2. The fluidic structure of claim 1, wherein the film comprises a film selected from the group comprised of: polymer, polyimide, polytetrafluoroethylene, metal and composite.

3. The fluidic structure of claim 1, wherein the depth of the inlet equals ⅔ of the thickness of the film.

4. The fluidic structure of claim 1, wherein the film has a thickness of 0.076 millimeters.

5. The fluidic structure of claim 4, wherein the depth equals 0.051 millimeters.

6. A method of manufacturing a fluidic structure in a film, comprising:
   forming a cavity, an inlet and a body port by removing a portion of the film from the top surface to a first depth to form a cavity, an inlet and a body port at a first depth that is less than the film thickness; and
   removing a portion of the film in the cavity from the first depth to a back surface of the film to form a particle filter in the cavity and removing a portion of the film in the inlet and the body port to second depth.

7. The method of claim 6, further comprising eliminating any remnants of the film in the inlet and body port.

8. The method of claim 6, further comprising:
   positioning a first imaging mask over a region of the film;
   illuminating the mask with an ablation laser to remove portions of the film to form the cavity, inlet and body port to a first depth;
   illuminating a second mask with the ablation laser to form the particle filter and remove the portion of the film in the Melt and the body port to second depth;
   moving the film to position a new region of the film adjacent an imaging field of the laser; and
   continuing to move the film and illuminate the first and second image masks until all cavities, inlets, body ports and particle filters have been formed.

9. The method of claim 6, comprising:
   positioning an imaging mask over a first region of the film;
   etch the film in the first region to the first depth to define the cavities, inlets and body ports;
   moving the film to a position new region of the film adjacent an imaging field of a laser;
   continuing to move the film and etch the film to the first depth until all of the cavities, inlets and body ports have been etched to the first depth;
   moving the film to position the first region adjacent the imaging film and using a second mask to etch the particle filter and the inlet and body port to the second depth in the first region; and
   continuing to move the film and etch until all of the particle filters, inlets and body ports have been etched to the second depth.

10. The method of claim 6, wherein forming a cavity, an inlet and a body port comprises removing a portion of the film from the top surface down to a depth.

11. The method of claim 6, further comprising bonding the film to a rigid plate prior to forming the cavity.

* * * * *